US008881007B2

(12) United States Patent
St. Jacques, Jr. et al.

(10) Patent No.: US 8,881,007 B2
(45) Date of Patent: Nov. 4, 2014

(54) METHOD AND SYSTEM FOR VISUAL CUES TO FACILITATE NAVIGATION THROUGH AN ORDERED SET OF DOCUMENTS

(75) Inventors: Robert J. St. Jacques, Jr., Fairport, NY (US); Mary Catherine McCorkindale, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 191 days.

(21) Appl. No.: 13/274,434

(22) Filed: Oct. 17, 2011

(65) Prior Publication Data

US 2013/0097494 A1 Apr. 18, 2013

(51) Int. Cl.
*G06F 17/21* (2006.01)
*G06F 17/30* (2006.01)

(52) U.S. Cl.
CPC ................................ *G06F 17/30716* (2013.01)
USPC .......................................................... 715/273

(58) Field of Classification Search
CPC ..................................................... G06F 17/211
USPC ......................................................... 715/273
See application file for complete search history.

(56) References Cited

U.S. PATENT DOCUMENTS

| | | | | |
|---|---|---|---|---|
| 6,233,571 | B1 * | 5/2001 | Egger et al. | 707/999.002 |
| 7,539,653 | B2 | 5/2009 | Handley | |
| 7,711,747 | B2 | 5/2010 | Renders et al. | |
| 7,747,611 | B1 * | 6/2010 | Milic-Frayling et al. | 707/722 |
| 8,090,717 | B1 * | 1/2012 | Bharat et al. | 707/731 |
| 2002/0116420 | A1 * | 8/2002 | Allam et al. | 707/526 |
| 2003/0046277 | A1 * | 3/2003 | Jackson et al. | 707/3 |
| 2003/0225757 | A1 * | 12/2003 | Evans et al. | 707/3 |
| 2004/0139400 | A1 * | 7/2004 | Allam et al. | 715/526 |
| 2004/0255237 | A1 * | 12/2004 | Tong | 715/501.1 |
| 2004/0260692 | A1 * | 12/2004 | Brill et al. | 707/5 |
| 2006/0156222 | A1 * | 7/2006 | Chi et al. | 715/512 |
| 2006/0206467 | A1 * | 9/2006 | Jackson et al. | 707/3 |
| 2008/0005102 | A1 * | 1/2008 | Hull et al. | 707/5 |
| 2008/0027933 | A1 * | 1/2008 | Hussam | 707/6 |
| 2008/0033929 | A1 * | 2/2008 | Al-Kofahi et al. | 707/5 |
| 2008/0086680 | A1 * | 4/2008 | Beckman | 715/230 |
| 2008/0140616 | A1 * | 6/2008 | Encina et al. | 707/3 |

(Continued)

OTHER PUBLICATIONS

Bernstein, Yaniv, and Justin Zobel. "Redundant documents and search effectiveness." In Proceedings of the 14th ACM international conference on Information and knowledge management, pp. 736-743, ACM, 2005.*

(Continued)

*Primary Examiner* — Frank D Mills
(74) *Attorney, Agent, or Firm* — Fay Sharpe LLP

(57) ABSTRACT

Systems and methods for organizing a repository of unstructured documents into groups of ordered reading lists, i.e., document trails, comprising an ordered list of documents that relate to each by subject matter. Text analytics and natural language processing steps group documents, chose the most important/relevant documents from each group, and organize the documents into a suggested reading order. Document fragments are also analyzed by such analytic and processing steps to identify preselected fragment characteristic aspects. Documents within each document trail may be marked up or highlighted to indicate which paragraphs therein contain such aspects as novel or useful information, or information that is not useful or redundant.

14 Claims, 5 Drawing Sheets

(56) References Cited

U.S. PATENT DOCUMENTS

| | | | | |
|---|---|---|---|---|
| 2008/0222103 | A1* | 9/2008 | Zhang et al. | 707/3 |
| 2008/0301095 | A1* | 12/2008 | Zhu et al. | 707/3 |
| 2009/0043824 | A1* | 2/2009 | Claghorn | 707/200 |
| 2009/0180126 | A1* | 7/2009 | Matulic | 358/1.1 |
| 2009/0234816 | A1* | 9/2009 | Armstrong | 707/3 |
| 2009/0327878 | A1* | 12/2009 | Grandison et al. | 715/256 |
| 2010/0125601 | A1* | 5/2010 | Jackson et al. | 707/780 |
| 2010/0332977 | A1* | 12/2010 | Nelson et al. | 715/273 |
| 2011/0066616 | A1* | 3/2011 | Rhoads et al. | 707/737 |
| 2011/0131211 | A1* | 6/2011 | Harrington | 707/741 |
| 2011/0145269 | A1* | 6/2011 | Kraftsow et al. | 707/766 |
| 2011/0179024 | A1* | 7/2011 | Stiver et al. | 707/728 |
| 2012/0054221 | A1* | 3/2012 | Zhang et al. | 707/769 |
| 2012/0303629 | A1* | 11/2012 | Klein et al. | 707/741 |
| 2012/0317468 | A1* | 12/2012 | Duquene et al. | 715/207 |

OTHER PUBLICATIONS

Blei, David M., Ng, Andrew Yi, Jordan, Michael I., "Latent Dirichlet Allocation", Journal of Machine Learning Research 3 (2003), pp. 993-1022. Published Jan. 2003 (http://www.cs.princeton.edu/~blei/papers/BleiNGJordan2003.pdf).

Jensen-Shannon divergence, http://en.wikipedia.org/wiki/Jensen%E2%80%93Shannon_divergence Page modified on Jan. 10, 2012 at 18:28.

Iacobelli, Francisco, Birnbaum, Larry, Hammond, Kristian J., "Tell Me More, not just 'More of the Same'", IUI'10, Feb. 7-10, Hong Kong, China, Copyright 2010 ACM 978-1-60558-515-4/10/02, pp. 1-10.

* cited by examiner

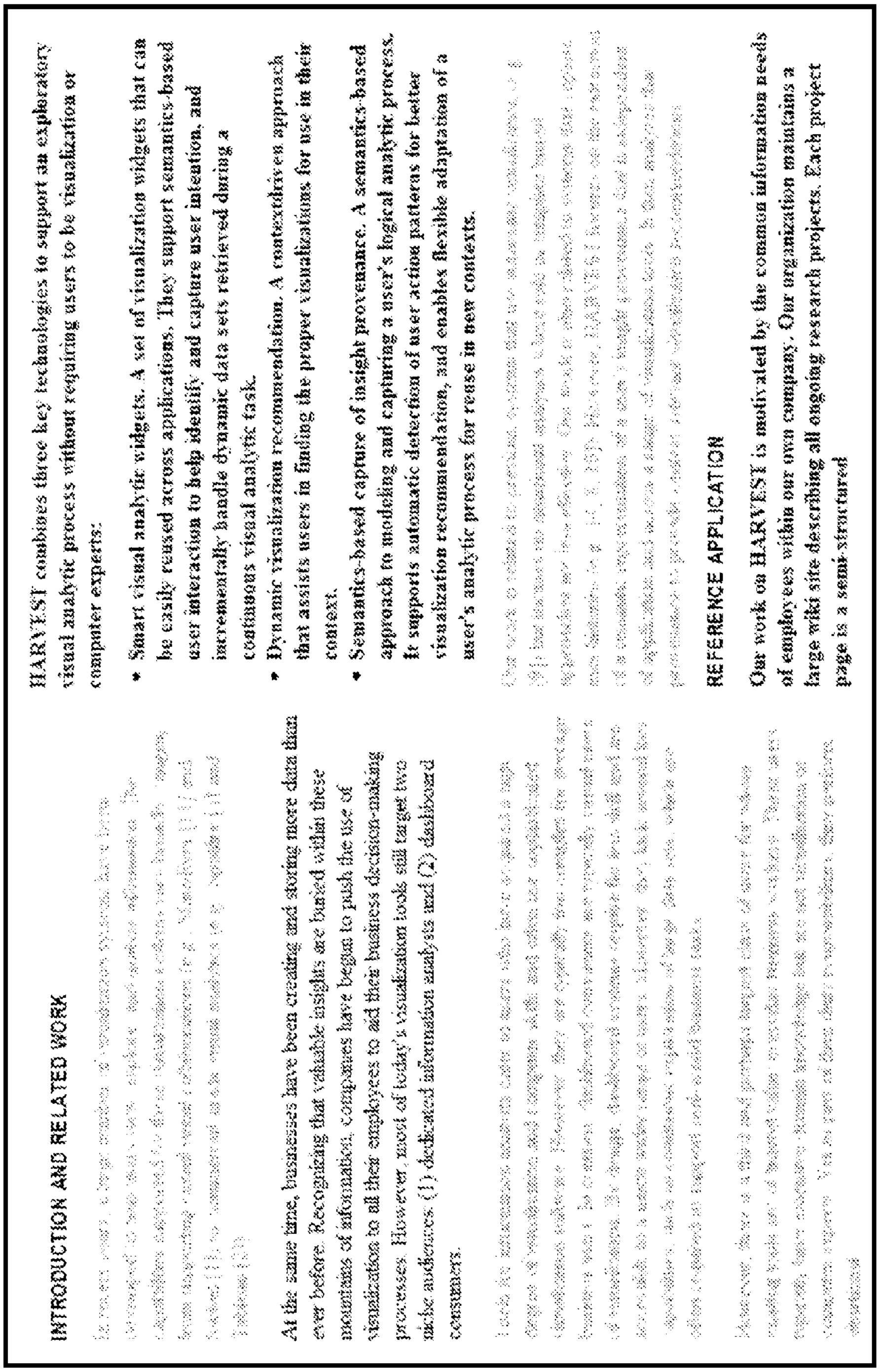

INTRODUCTION AND RELATED WORK

[illegible]

At the same time, businesses have been creating and storing more data than ever before. Recognizing that valuable insights are buried within these mountains of information, companies have begun to push the use of visualization to all their employees to aid their business decision-making processes. However, most of today's visualization tools still target two niche audiences: (1) dedicated information analysts and (2) dashboard consumers.

[illegible]

[illegible]

HARVEST combines three key technologies to support an exploratory visual analytic process without requiring users to be visualization or computer experts:

- Smart visual analytic widgets. A set of visualization widgets that can be easily reused across applications. They support semantics-based user interaction to help identify and capture user intention, and incrementally handle dynamic data sets retrieved during a continuous visual analytic task.
- Dynamic visualization recommendation. A contextdriven approach that assists users in finding the proper visualizations for use in their context.
- Semantics-based capture of insight provenance. A semantics-based approach to modeling and capturing a user's logical analytic process. It supports automatic detection of user action patterns for better visualization recommendation, and enables flexible adaptation of a user's analytic process for reuse in new contexts.

[illegible]

REFERENCE APPLICATION

Our work on HARVEST is motivated by the common information needs of employees within our own company. Our organization maintains a large wiki site describing all ongoing research projects. Each project page is a semi-structured

FIG. 6

METHOD AND SYSTEM FOR VISUAL CUES TO FACILITATE NAVIGATION THROUGH AN ORDERED SET OF DOCUMENTS

BACKGROUND

The disclosed embodiments generally relate to the field of data base management, and more particularly to clustering a set of documents in a document repository into cluster groups, and then organizing the clustered groups into an ordered reading list based upon the relational strength and usefulness to a topic. Such an ordered reading list comprises a document trail for efficient topical reading by a user. The documents are displayed to a reader/user with visual cues associated with document fragments indicating characteristic aspects of the fragment.

The ability to store documents electronically has led to an information explosion. Information bases such as the Internet, corporate digital data networks, electronic government record warehouses, and so forth, store vast quantities of information, which motivates development of effective information organization systems. Two commonly used organizational approaches are categorization and clustering. In categorization, a set of classes are predefined, and documents are grouped into classes based on content similarity measures. Clustering is similar, except that no predefined classes are defined, rather, documents are grouped or clustered based on similarity, and groups of similar documents define the set of classes. U.S. Pat. Nos. 7,539,653 and 7,711,747 are typical examples of clustering techniques.

The use of such clustering management system to facilitate organization, or even when such documents are organized into groups manually, is usually followed by readers/users of the clustered groups manually reading through the data of the documents therein, and then making subjective judgment calls about whether or not a document is relevant or useful to a related topic. The problem involved is that such a judgment can only occur by the manual reading of the entire document itself. Manual reading of related documents usually involves a lot of wasted time due to document redundancies and overlap. It is not uncommon for each document in a series to have much duplicate information already provided by documents earlier in the series. People reading such a series of documents often must spend a significant amount of time trying to determine what novel content exists in each subsequent document in the series. This frequently leads to "skimming" where readers attempt to quickly parse documents at some level of granularity (e.g., by paragraph) to try to quickly determine if the information provided is novel or useful. This can lead to a waste of time and missed information.

Many proposed solutions in the conceptual space shared by the subject embodiments attempt to make decisions on behalf of a user. Documents are split into fragments of information (typically at the paragraph level) and those fragments are grouped into categories by topic. Sophisticated text analysis techniques are used to determine whether two paragraphs (often written by different authors in different documents) convey the same basic idea. In many cases, information fragments deemed "redundant" are discarded before the user has a chance to see and decide. This can result in a loss of context. Stitching fragments from different documents (written in different voices by different authors, with potentially different sentiments and points of view) can result in a compilation of difficult to understand and cobbled together concepts. Additionally, many solutions in this space use "seed documents" or search engine results to determine the starting position and ranking order of the documents, which loses contextual information such as chronology or dependency.

Thus, there is a need for improved systems and methods for further organizing a document repository for more efficient reader/user review of accessible documents by minimizing presented overlap, redundancy or non-useful information, and highlighting desired new, particularly useful or strongly related information to the desired topic. Such needed systems and methods would keep the original documents in the document trail sequence completely intact and only highlight the fragments of information and the preselected intended characteristic aspects using clear visual cues that allow the users to immediately identify at least information in the following categories:

- New—information that appears later in the document sequence, but is seen for the first time in the current document.
- Novel—unique information that only appears in the current document;
- Redundant—duplicate information that has appeared previously in the document sequence; and,
- Current position in the trail—where the document that the reader is currently reviewing exists in the overall trail of documents.

The present embodiments are directed to solving one or more of the specified problems and providing a fulfillment of the desired needs.

SUMMARY

The embodiments relate to a highlighting process wherein a corpus of a document set is analyzed in accordance with preselected text analytics and natural language processing steps for identifying grouping relationships for sets of documents therein and clustering the sets into a plurality of clustered groups. Such parsing of the documents in the repository is responsive to identification of words in the documents themselves that are deemed significant by the text analytic and language processing steps. Fragments such as paragraphs or other portions are highlighted by visual cues representing a characteristic aspect of the fragment, facilitating and expediting a reader's review of the document for novel or useful information.

The embodiments further provide a methodology for organizing a repository of unstructured documents into groups of ordered reading lists, i.e., document trails. Each "document trail" is an ordered list of documents that are related to each other by subject matter. The disclosed embodiments combine standard tools for text analytics and natural language processing (e.g., topic extraction, entity extraction, meta data extraction, readability) with machine learning techniques (e.g., document clustering) to group documents, choose the most important/relevant documents from each group, and organize those documents into a suggested reading order. The documents within each document trail are marked up or highlighted to indicate which paragraphs therein contain novel or useful information. Such visual cues may be limited to highlighting the text of the paragraph, or could contain more advanced information (i.e. tool tips that identify what is special about the information, and why). Such a system would allow users to quickly identify novel information in each subsequent document in the trail, and perhaps more importantly, identify redundant information that can be safely skipped. Because no information is actually discarded from the original documents, contextual information is not lost.

Before the present methods, systems and materials are described in detail, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications, and specifically cited patents, mentioned herein are incorporated by reference. Nothing herein is to be construed as an admission that the embodiments described herein are not entitled to antedate such disclosure by virtue of prior invention.

In accordance with certain embodiments illustrated herein, a method is disclosed for creating an ordered reading list for a set of documents. The method comprises: analyzing a corpus of the document set in accordance with preselected text analytics and natural language processing steps for identifying a grouping relationship and clustering the set into a plurality of cluster groups; prioritizing the documents in a one of the cluster groups in relation to importance to a topic of the cluster group; and organizing the documents in accordance with the prioritizing into the ordered reading list as a document trail for sequential access to a reader of the document set. A document is displayed to the reader via a reader/display interface wherein the document is comprised of document fragments of content. A visual cue is applied to a fragment during the displaying indicating a characteristic aspect of the fragment relative to the topic and other fragments of other documents in the document trail. The visual cue indicating the character aspects can signify newness, novelty and redundancy of a fragment, or current relative position of a presented document in the trail.

In accordance with other aspects of the subject embodiments, an order document reading list is provided comprising a set of documents having a common relation to a topic, each document including fragments of content, wherein the documents are arranged by strength of relation to the topic in a sequence of usefulness to a reader of the list. Selected fragments of content include visual cues indicating one of newness, novelty, redundancy or position in the list, for a displayed fragment in a presented document being read by the reader, relative to other documents in the list. The fragments comprise an entire content of the documents in the list, whereby fragment contextual meaning is maintained among the visual cues.

BRIEF DESCRIPTION OF THE DRAWINGS

FIG. 6 is an exemplar of a display using an alternative style of visual cues for a document within a document trail.

DETAILED DESCRIPTION

The disclosed embodiments provide methods and systems that can be applied to a large set of unstructured documents such as a typical document repository corpus 16. The subject methodology separates the documents in the corpus into groups by determining how strongly related the individual documents are with respect to discerned topics therein. Such a topical model is acquired through known clustering processes employing text analytics and natural language processing steps that can identify a grouping relationship for the documents so that they may be clustered into distinct clustered groups. For each group, the most useful documents are extracted and then ordered into a reading list. Usefulness is typically determined based upon identifying words in the document that are the most significant therein.

The disclosed embodiments are intended to display/provide a reading user of the subject system an ordered reading list 10 comprising a sequential order of documents 12 with a defined beginning comprising a first document suggested by the system as being most relevant to the topic of interest to the reader. Such an ordered reading list is referred to herein as a "document trail". The document trail is intended to provide a reader with a suggested shortest path to the most relevant documents about a specific topic in a highly efficient manner by identifying novel or particularly useful information and identifying redundant overlap or less useful information with some forms of visual cues for selective and easy overlooking by the reader. Unlike other tools that are designed to increase the efficiency of reading a collection of related documents, the proposed invention does not suggest that decisions be made on behalf of the user about which information fragments should be kept, and which fragments should be discarded. Instead, all information is preserved, completely in context, but the reader is given the tools that they need to quickly decide for themselves whether to read, skim, or skip individual fragments entirely.

In addition, it is proposed that the user should be able to interact with individual data fragments to learn more about why a specific data fragment was highlighted using a particular cue. For example, clicking on a specific paragraph with the mouse (or tapping in a touch-screen application) may produce a tool tip that provides additional descriptive details to the user, helping them to decide whether or not to read/skim/skip the fragment.

Figure 1:
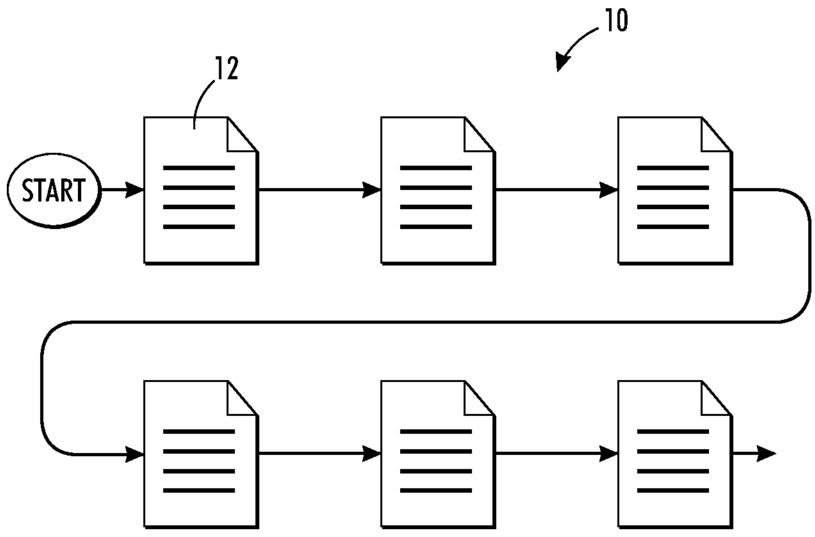
FIG. 1 diagrammatically shows the concept of a document trail comprising an ordered reading list of documents.
Figure 2:
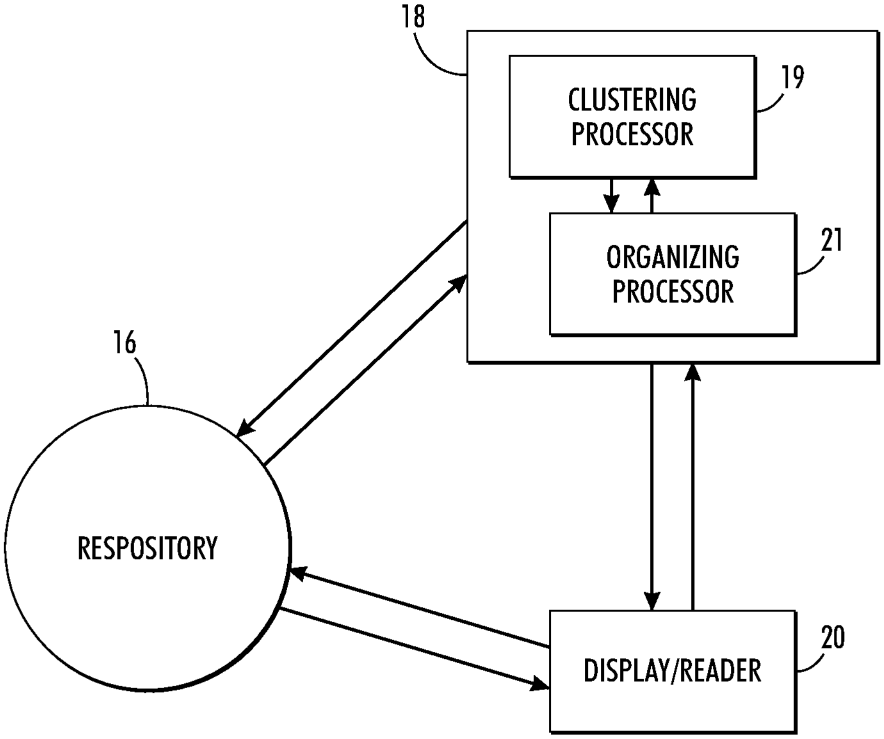
FIG. 2 is a block diagram of a system for processing a repository of documents into a document trail.
Figure 3:
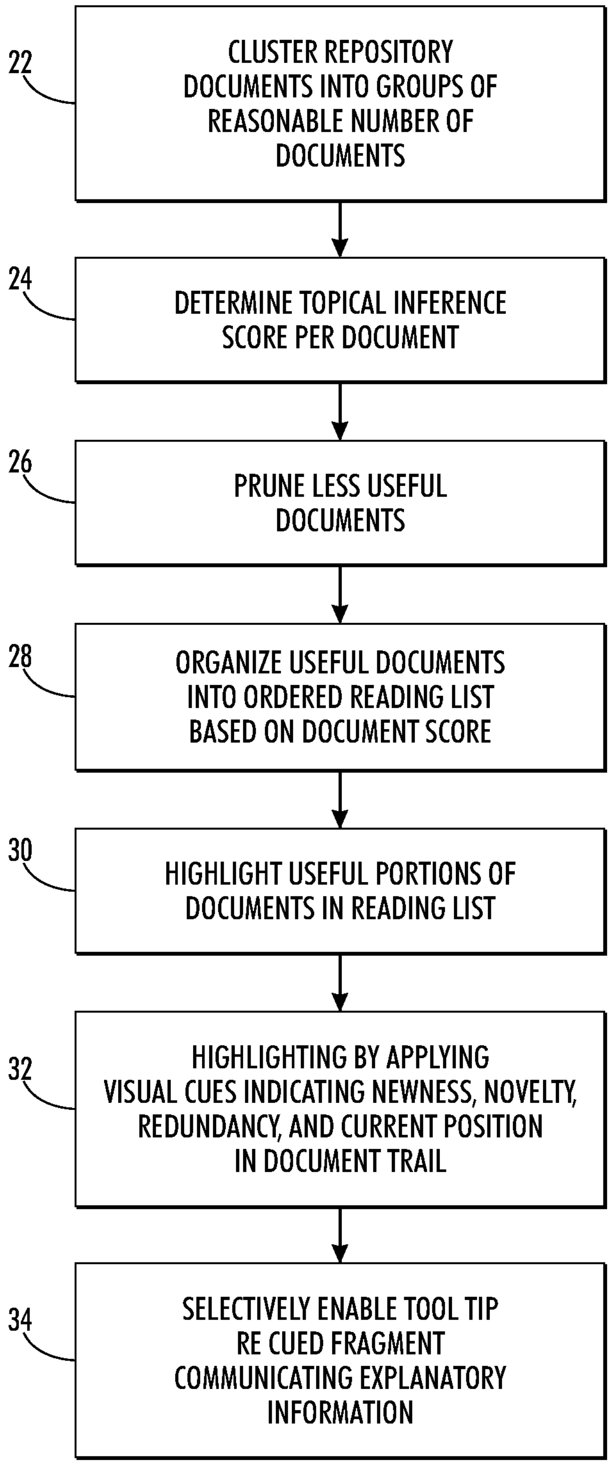
FIG. 3 is a flowchart showing steps for creating an ordered document trail from a repository corpus and applying selected visual cues to document fragments.

With reference to FIGS. 1, 2 and 3, the subject document trail 10 is constructed from a repository 16 on behalf of a user using text analytics, machine learning and inference. A processing system 18 clusters the documents from the repository with a clustering processor 19 and organizes relevant documents in the clustered groups into the document trails with an organizing processor 21. The user accesses the documents through an interactive display/reader 20.

In general, the creation and consumption of a document trail includes the following steps: first, document clustering; second, choosing relevant documents; third, choosing the best documents, fourth, ordering the documents; and fifth, a user interacting through an interface to allow the user to navigate through a trail.

The first step, document clustering 22, involves grouping the repository corpus into natural groupings based upon information contained in the individual documents. The text analytics and natural language processing steps involved in the grouping are known and typical exemplars therefor are included in the clustering patents referenced above. A topic model is created using a training set (e.g., a randomly selected sample of significant size) from the full document corpus; each topic in the model is a collection of keywords that frequently appear together throughout the corpus. The number of topics is variable so the particular number may change, but generally it is selected to ultimately end up with a reasonable number of document trails. Anything between ten and fifty could be a reasonable number of trails to a user, so the number of topics will usually correspond to obtaining the trail objective. Once the topic model is created, the documents are clustered by topic by placing them into "buckets" for each topic, and then sorting them based on the probability that the topic describes that document.

The analytics comprise generating a topic inference for each document in the corpus, one at a time. The inference comprises a calculation in probability distribution across the topic model that a particular topic describes that document based upon the occurrence of keywords in the document. Simply stated, if a lot of keywords corresponding to a particular topic appear in the document, the document will get a higher topical inference score; and if keywords are lacking, or do not appear in the document, then the document will get a lower score. Latent Dirichlet Allocation is a more specific implementation for such topic modeling/inference. http://www.cs.princeton.edu/~blei/papers/BleiNgJordan2003.pdf. After the documents of the corpus have all been analyzed, it can be determined for each document in the system how many topics are commonly related in each document. In other words, if a document has high scores for a plurality of the same topics, those documents are considered to be strongly related—because they are generally discussing the same topical subjects. Additionally though, it is desired that a presented document trail comprise a reasonable number of documents, i.e., one that is comfortably accessible and consumable by a user/reader. Typically, a cluster group can be preselected to be in the range of ten to fifty documents based upon the topical subject matter at hand. For larger repositories including a vast number of documents, a clustering may involve several clustering iterations to continually distill the groupings into the desired reasonable number.

The choice of the relevant documents in a cluster group to be presented in the document trail involves pruning documents that contain no or minimal useful information. Within each cluster there is likely to be a large number of documents that contain useless information (i.e., redundant or unrelated to the cluster group). In order to form the trail, such documents must be pruned 26 which can be implemented again with reference to the corresponding topical inferential scores. For example, if there is less than a five percent chance that a given topic describes a document, that document is dropped from the cluster. Redundancy of paragraphs between different documents within the cluster group can similarly be identified through applying the same text analytic and natural language processing techniques for keyword identification to individual paragraphs as for the document itself.

A document trail is next built by choosing the best documents from the relevant documents. Once only relevant documents that contain useful information remain in the group, a specific target number/percentage of best documents may be chosen in order keep the trail length reasonable and small. Again, analytics and inference may be combined with user preferences and feedback either dynamically or statically to prune the trail. Different kinds of thresholds may be used for so identifying the most useful documents; for example, by choosing the top N documents based on topical inference/probability scores, or based on detected closeness to a topical cluster centroid, or dropping documents that are beyond a certain threshold from the centroid. Because documents are being related across a potentially broad spectrum of topics, it is difficult to choose any one topic to represent a cluster of documents. Two documents are related because they share similar probability scores across a plurality of topics; in a topic model that contains hundreds of topics, two documents could potentially have a large number of topics in common (e.g. 10 or more, easily). When more documents (10, 25, 50+) are added to the cluster, the relationships between documents and specific topics becomes even more complex. Overcoming this problem is based on calculating the cluster "centroid," which is a point in Euclidian space that represents the "center" of the cluster (or, in this case, the probability distribution across the topic model for an "ideal document" in that cluster; this is easily done by averaging all of the probability distributions for the documents in the cluster). It is then possible to calculate how closely affiliated a document is with the cluster by calculating its distance from the centroid (e.g. how far its probability distribution is from the ideal, which can be done using a common technique called "Jenson Shannon Divergence <http://en.wikipedia.org/wiki/Jensen%E2%80%93Shannon_divergence>"). Weaker documents on the fringes of the cluster are dropped to get down to a specific, desirable number.

Ordering the documents in a document trail is accomplished by organizing 28 the documents into a logical reading order based on specific criteria, for example: most novel content first, oldest first, newest first, readability (for example this can be determined using natural language processing to count syllables per word, and words per sentence); or the documents can be presented in a random order. A preferred order would be based on documents' probability scores.

With reference to FIG. 2, the disclosed embodiments provide a user interface 20 that allows the user to navigate through a document trail (forward, backward, skipping N documents) and to move between trails. The user's state relative to the trails (e.g., position in a particular trail, which documents were read) is kept persistently, allowing the user to pick up at the last position in the most recent trail automatically. Additionally, users may provide feedback as they navigate the trail (e.g., more documents like this, documents that are easier to read than this, etc.). This feedback can be used in real time to alter the documents that appear later in the trail, effectively creating a branch (FIG. 7). For example, if a user indicates that they would like to read "more documents like this one," entity extraction can be used to find more documents that cover similar people, places, and events later in the trail; even documents that originally had been dropped from the trail. Also, the system may consider documents that a user has most recently stored/saved, and prioritize trails that include those documents.

Figure 4:
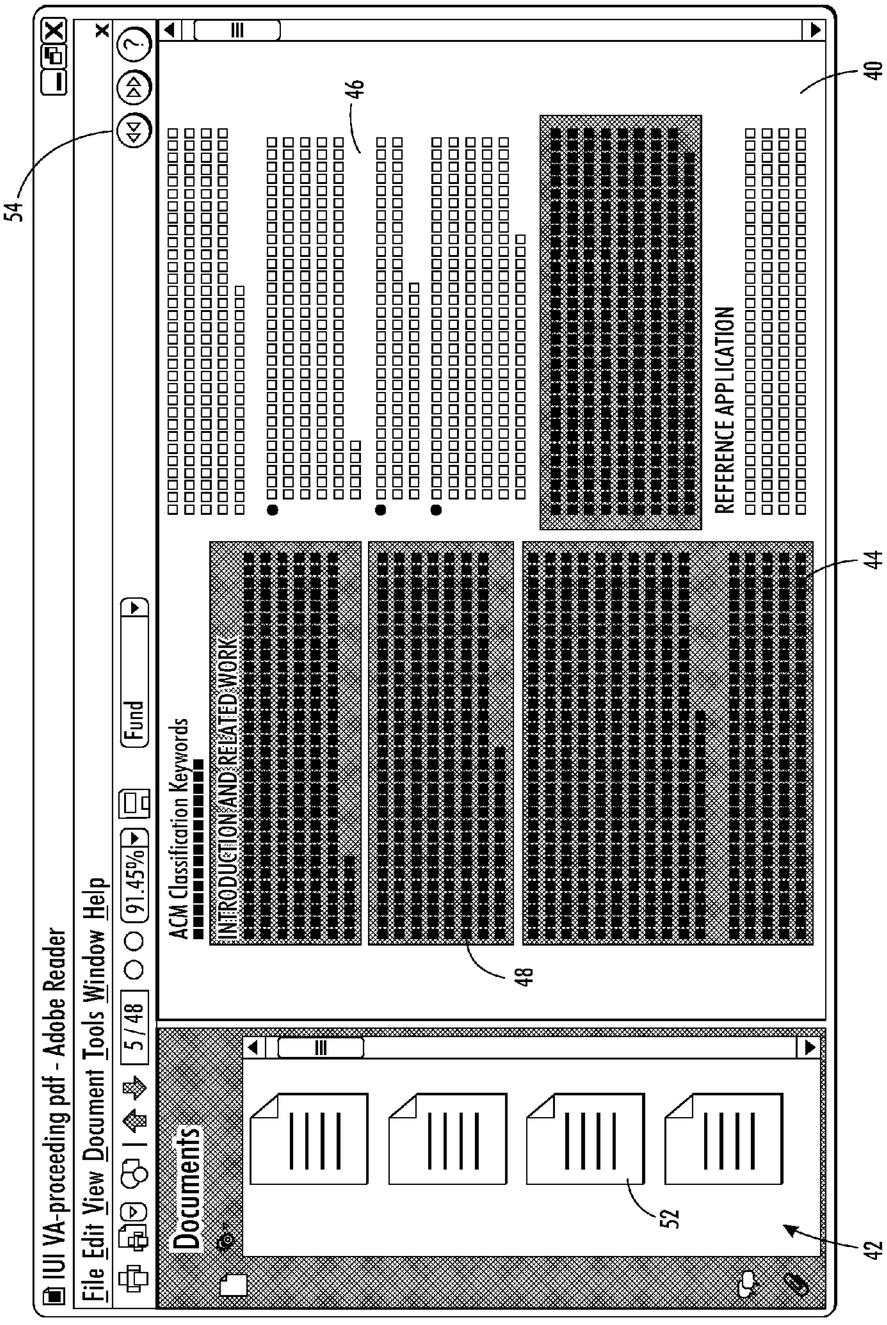
FIG. 4 is an exemplar of a document display using visual cues to indicate particular portions having distinctive significance on a displayed page being read by a user.

According to further aspects of the subject embodiments, anytime while reading the trail, a user can mouse over the "?" 54, FIG. 4, in the displayed screen. This opens a small survey that allows the user to provide real time feedback by rating different aspects of the trail. For example:

Please rate the reader level of this trail from 1 (far too easy) to 5 (way too hard) with 3 being "about right:" 1 2 3 4 5

Please rate the relevance of this trail to your desired topic from 1 (not relevant at all) to 5 (totally relevant): 1 2 3 4 5

You have 7 documents with about 15,000 words that will take approximately 3 hours to read. Please use the sliding scale to suggest adjustments from shorter to longer.

Check this box to save these settings and remember them for next time.

Depending on the feedback that the user provides, future documents in the trail may be adjusted to reflect the user's preferences.

Figure 5:
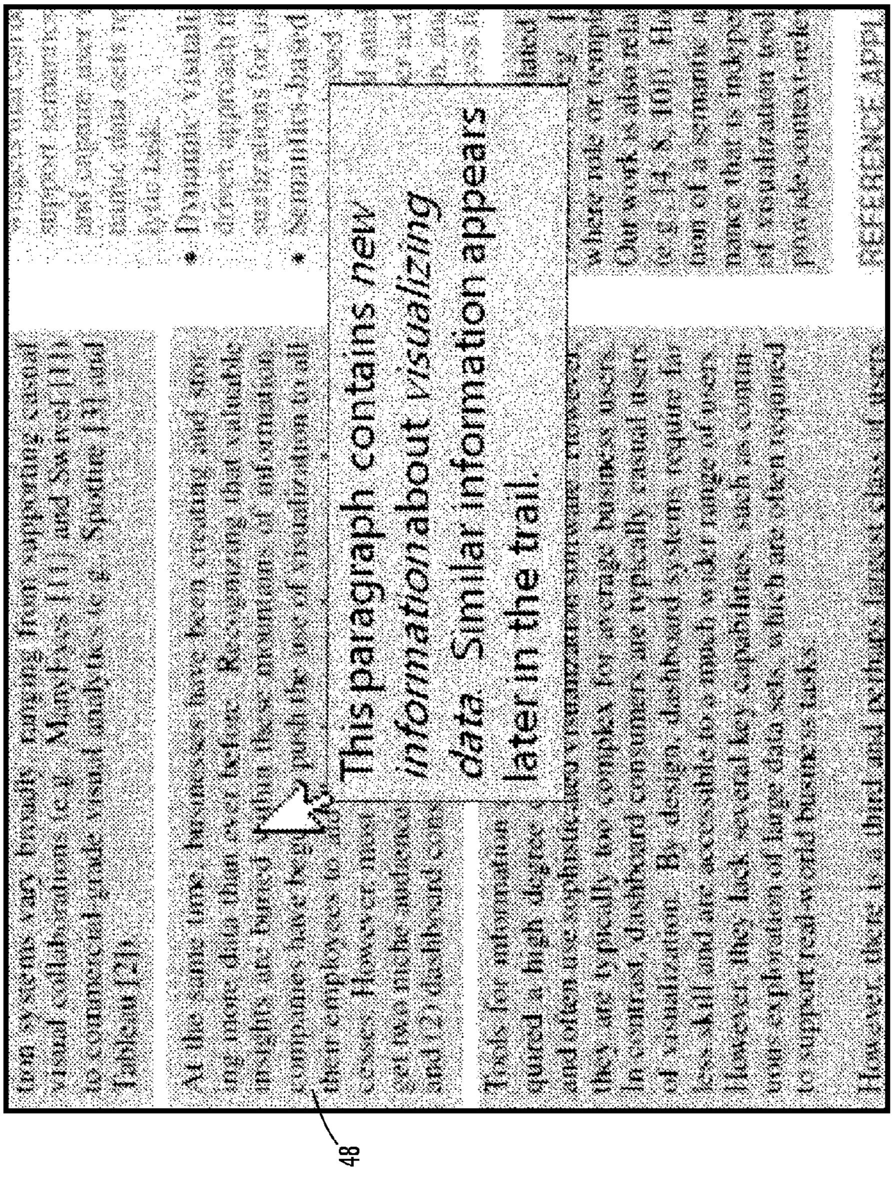
FIG. 5 is an exemplar of a display comprising a tool tip explaining a highlighted portion of the display.

A particular feature of the subject embodiments is the selective highlighting 30 of useful portions of documents in the reading list. The highlighting includes applying 32 visual cues indicating newness, novelty, redundancy and current position in the document trail. In addition, tool tips may be selectively enabled 34 communicating explanatory information about a particular cued fragment. With reference to FIGS. 4-6, aspects of the subject embodiments are disclosed wherein a series of documents are arranged into an ordered list and that each document in the series contains visual cues at the fragment or paragraph level identifying the novelty of the information presented in that document portion. Such visual cues may be limited to highlighting the text in the paragraph, or could contain more advanced information (i.e., tool tips to identify what is special about the information, and why). Such a system allows users to quickly identify novel information in each subsequent document in the series, and additionally, identify redundant information that can be safely skipped. Because no information is actually discarded from the original documents, contextual information is not lost.

With particular reference to FIG. 4, it can be seen that displayed original document 40 is displayed completely intact on the interactive reader 20 to assist users/readers in navigating a document trail comprising a sequence of related documents about a specific topic. The original document 40 in the document trail sequence 42 remains completely intact but fragments of information (e.g., paragraphs) 44, 46, 48 are selectively highlighted using clear visual cues to allow users to immediately identify at least information in the following categories: New—information that appears later in the document sequence, but is seen for the first time in the current document; Novel—unique information that only appears in the current document; Redundant—duplicate information that has appeared previously in a document sequence; and, Current position in the trail—where the document that the reader is currently viewing exists in the overall trail of the documents. This indication of position is in contrast to other mechanisms that provide essentially unbounded search results (e.g., "you are viewing document 94 of 437965"). In FIG. 4, specifically highlighted section 48 represents new information (e.g., a green background); highlighted portions 46 represent unique information (e.g., a yellow background); and, highlighted portions 44 represent redundant (previously seen) information (e.g., a red background). The reader's position in the trail is shown in the pane 42 by highlighting the presented document 52 with particular highlighting (e.g., yellow). Each document in the trail is represented as a single node in the pane. Controls 54 are exemplary and may be used by the reader to move forward and backward in the document trail, or to provide feedback to alter the trail. For example, the question mark can be accessed to allow the user to deviate from the present trail to certain other branches as noted above.

The subject implementations are designed to increase the efficiency of reading a collection of related documents. The embodiments do not suggest that decisions be made on behalf of the user about which information fragments should be kept, and which fragments should be discarded. Instead, all information is preserved, completely in context, but readers are given the tools that they need to quickly decide for themselves whether to read, skim or skip individual fragments entirely.

With reference to FIG. 5, an aspect of the embodiments of the embodiments is shown where the user is able to interact with individual data fragments to learn more about why a specific data fragment was highlighted using a particular visual cue. More particularly, clicking on paragraph 48 which had been highlighted with a cue signifying new information with a mouse (or tapping a touch screen application) will produce a tool tip that provides additional descriptive details to the user, helping them to decide whether or not to read/skim/skip the fragment. In this example, the feedback explaining why the selected paragraph was highlighted with a cue representing new information is that the paragraph contains "new information about visualizing data. Similar information appears later in the trail."

The subject embodiments comprise methods and systems that have as a primary goal a simple, intuitive interface that allows a reader/user to respond immediately and instinctively. As such, the document trail application is configurable by the user. Examples of potential configuration options include: enabling or disabling specific kinds of highlighting. [For example, disabling the highlighting for "novel" text so that it appears unaltered (e.g., "black and white")]; customizing highlight colors (for example, allowing the reader to use a color picker to define the custom highlighting colors.); configuring "new" and "novel" materials to use the same highlight colors; and, blacking or blocking out redundant information entirely.

The examples provided throughout this specification are provided to clearly communicate the concept of a document trail with visual cues, but they are not meant to be comprehensive. Other related and similar mechanisms for providing visual feedback about the relative novelty of data fragments within a cluster of documents are also considered to be within the scope of the subject embodiments.

FIG. 6 represents a further example demonstrating in alternative methodology for achieving the same functionality as is described above. In FIG. 6 redundant information is blurred out and the new/novel information is left black-on-white (it may also be bolded). While the blurry text is still legible, the user may non-select a blurry text to see a crisp, more readable view if they wish to.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The disclosed elements can encompass embodiments in hardware, software, or a combination thereof.

What is claimed is:

1. A method of using visual cues to facilitate navigation through an ordered set of documents, comprising:

organizing the set of documents by a relationship to a topic as a document trail wherein the documents are prioritized in a logical reading order in the trail based on usefulness to a user;

displaying a document to the user via a reader/display interface wherein the document is comprised of document fragments of content; and applying a readable visual cue to a fragment to highlight the fragment text during the displaying indicating a characteristic aspect of the logical reading order and the fragment relative to the topic and other fragments of other documents in the document trail including indicating a character aspect from one of newness, novelty, redundancy, and current relative position of a presented document in the trail with each having a different highlighting, wherein the character aspect is related to content of other documents in the ordered set of documents.

2. The method of claim 1 wherein the applying a visual cue indicating newness identifies a cued fragment as containing information common to an other fragment sequenced for subsequent presentation later in the document trail.

3. The method of claim 1 wherein the applying a visual cue indicating novelty identifies a cued fragment containing information only appearing in the presented document within the document trail.

4. The method of claim 1 wherein the applying a visual cue indicating redundancy identifies a cued fragment containing information that has been previously presented in earlier presented fragments in the document trail.

5. The method of claim 1 wherein the applying a visual cue indicating current relative position identifies a location in the overall sequence of documents comprising the document trail.

6. The method of claim 1 wherein the applying a visual cue comprises displaying background color for the fragment representative of the characteristic aspect.

7. The method of claim 1 wherein the applying a visual cue comprises presenting a distinctive textual adjustment of text format in the fragment.

8. The method of claim 1 wherein the organizing preserves all content fragments of the presented document.

9. The method of claim 1 wherein the applying a visual cue further includes displaying a tool tip communicating explanatory information of a presented visual cue for a fragment.

10. An ordered document reading list stored on a non-transitory computer readable medium comprising:

a set of documents having a common relation to a topic, each document including fragments of content, and wherein the documents are arranged in a logical reading order by strength of relation to the topic in a sequence of usefulness to a reader of the list; and, wherein selected fragments of content include readable visual cues that highlight fragments indicating one of newness, novelty, redundancy or position in the logical reading order with each having a different highlighting, for a displayed fragment in a presented document being read by the reader, relative to content from other documents in the list.

11. The list of claim 10 wherein the visual cues comprise highlighting of fragment text.

12. The list of claim 10 wherein the visual cues comprise blurring of fragment text.

13. The list of claim 10 wherein the visual cues comprise supplemental explanation of the fragment content.

14. The list of claim 10 wherein the fragments comprise an entire content of the documents in the list, whereby fragment contextual meaning is maintained among the visual cues.

* * * * *